United States Patent [19]

Fuest

[11] 3,926,553

[45] Dec. 16, 1975

[54] METHOD OF RENDERING POLYOLEFINS DYEABLE WITH ANIONIC DYES

[75] Inventor: Ronald W. Fuest, Kinnelon, N.J.

[73] Assignee: Uniroyal, Inc., New York, N.Y.

[22] Filed: Oct. 13, 1972

[21] Appl. No.: 297,544

Related U.S. Application Data

[62] Division of Ser. No. 8,086, Feb. 2, 1970, Pat. No. 3,744,968.

[52] U.S. Cl. ............................ 8/169; 8/21 D; 8/25; 8/168; 8/172; 8/180
[51] Int. Cl.² ............................................. D06P 5/04
[58] Field of Search ....... 8/21 D, 25, 168, 169, 172, 8/180

[56] References Cited
UNITED STATES PATENTS

| | | | |
|---|---|---|---|
| 3,039,840 | 6/1962 | Savvaya et al. | 8/168 X |
| 3,098,692 | 7/1963 | Gagliardi | 8/168 X |
| 3,169,824 | 2/1965 | Gagliardi | 8/169 X |
| 3,230,029 | 1/1966 | Cappuccio et al. | 8/168 X |
| 3,361,843 | 1/1968 | Miller et al. | 8/180 X |
| 3,597,150 | 8/1971 | Brown et al. | 8/168 |
| 3,652,198 | 3/1972 | Farber et al. | 8/169 X |
| 3,707,351 | 12/1972 | Mecco | 8/168 X |

Primary Examiner—Harvey E. Behrend
Assistant Examiner—P. A. Nelson
Attorney, Agent, or Firm—Thomas A. Beck, Esq.

[57] ABSTRACT

The present invention relates to a method of selectively controlling the degree of dyeability of shaped articles produced from fiber-forming compositions of matter comprising a polyolefin and a minor amount of an alkyl or aralkyl amine-containing polymer, which method comprises either (1) treating said shaped articles with a weak-acid anionic surfactant to enhance dyeability, or (2) treating said shaped article with a strong-acid anionic surfactant to inhibit dyeability.

49 Claims, No Drawings

METHOD OF RENDERING POLYOLEFINS DYEABLE WITH ANIONIC DYES

BACKGROUND OF THE INVENTION

DESCRIPTION OF THE PRIOR ART

This is a division of application Ser. No. 8,086, filed Feb. 2, 1970, now U.S. Pat. No. 3,744,968.

Polyolefins are well-known for being inherently undyeable due both to lack of polar sites in their molecular structures to which dye molecules may become attached, and to difficulty of penetration of dye molecules into their molecular structures. Processes for overcoming these defects have long been sought because good dyeability is a prerequisite for many commercial applications to which these polymers would be outstandingly suitable.

U.S. Pat. No. 3,315,014 to Harry W. Coover, Jr. and Frederick B. Joyner discloses one method of rendering polypropylene fibers dyeable by blending a large amount, i.e. up to 25% or polymers of vinylpyridine into the polypropylene matrix. However, it has been determined, by using the method disclosed in the aforesaid patent, that when minor amounts of the vinylpyridine polymer, i.e. less than about 10%, are incorporated in a polypropylene fiber, it is relatively undyeable with acid dyes, metallized dyes, and direct dyes (all of which are anionic dyes) except for the production of pale tints, and this degree of dyeability is of little or no commercial utility.

Other techniques for making polyolefins dyeable similarly have involved the addition of relatively large amounts of basic polymer additive dye receptors.

It has been determined that when larger quantities, i.e. in excess of about 10% of an additive, particularly highly basic ones such as aliphatic amine-containing polymers, are blended with a polyolefin such as polypropylene, the resulting fiber is dyeable with anionic dyes but said fiber has disadvantages such as: (1) the physical properties are degraded; (2) the blended material, because of incompatibility of the mixed polymers, is difficult to extrude and process; (3) the fiber is somewhat rough and brittle due to the presence of the larger quantities of nitrogen polymer therein; and (4) the added expense of large amounts of nitrogen polymer is great. Thus, it is highly desirable to be able, to achieve dyeability with anionic dyes in polyolefin fibers with the addition of 5% or less of added basic polymer.

Processes for rendering polyolefins dyeable with acid type (anionic) dyes are described in U.S. Pat. No. 3,361,843 to Robert Miller et al. The process involves incorporating lesser amounts, generally between 0.5 and 10% of a basic nitrogen-containing polymer, for instance a polyamide or polyamine, into the inherently undyeable polymer before the polymer mixture is shaped into fibers. After being shaped, the fibers are made permeable to anionic, water-soluble dyes by acid after-treatment. The latter step is termed "activation".

U.S. Pat. No. 3,597,150 to C. N. Brown and A. Schwarz describes the use of anionic surfactants to increase the dyeability with anionic dyes of polyolefins containing a basic polymer dye receptor. The dye receptor in this invention is limited to vinylpyridine polymers, and it is shown with this type of dye receptor polymer that all types of anionic surfactants, irrespective of the nature of the acidic group contained therein (sulfate, phosphate, sulfonate, polyphosphate, carboxyl) produce enhancement of dyeability.

U.S. Pat. No. 3,659,009 R. Fuest and M. Farber discloses that polyolefins containing a combination of low levels of basic polymer dye receptors wherein the dye receptor contains alkyl- or aralkylamino groups, and a copolymer of an olefin with an acrylic or methacrylic acid, possess good dyeability with anionic dyes.

Similar types of basic polymer dye receptors are disclosed in U.S. Pat. No. 3,585,256.

It is an object of this invention to provide polyolefin fibers which are dyeable with anionic dyes to deep shades with good fastness properties. It is another object to provide a process for making polyolefin fibers from blends of highly dispersed constituents, which blends are easy to prepare, are readily dyeable and possess good thermal and oxidative stability. Other objects and advantages of this invention will be apparent to those skilled in the art from a study of this specification.

SUMMARY OF THE INVENTION

The invention relates to treating compositions of matter which comprises (A) between about 93 and 99% by weight of fiber-forming polymer selected from an alpha-olefin polymer and (B) between about 1 and 7% by weight of a polymeric amine dye receptor which is capable of fixing anionic dyes, with selected anionic surfactants, which treatment renders said composition highly dyeable with anionic dyes. Optionally the above-noted composition may contain a third or (C) component which consists of between about 1 and 5% by weight of a copolymer of an alkylene aliphatic hydrocarbon and acrylic or mathacrylic acid or salts thereof. In this case, the amount of (B) component necessary in the blend need only be between about 1 and 5% by weight, and obviously the (A) component will be between about 90 and 98% by weight.

All percentages listed herein for each component present in the fiber are given in percent-by-weight of the total composition.

The inherently undyeable alpha-olefin polymers comprise both homopolymers and copolymers of alpha-olefins, for example, copolymers with non-terminal olefins or with one or more other alpha-olefins, as well as block copolymers of alpha-olefins with polymers of other alpha-olefins. The class includes polyethylene, polypropylene, poly(3-methyl-1-butene), poly(4-methyl-1-pentene), copolymers of propylene and 3-methyl-1-butene, copolymers of propylene and copolymers of any of the foregoing monomers with each other and/or with other copolymerizable hydrocarbon monomers. The preferred material is polypropylene, by which we mean any polymers of propylene and any copolymer containing predominately polymerized propylene together with any other monomer copolymerized therewith.

The dye receptor compounds, (B), are thermoplastic, thermostable, alkyl- or aralkylamine-containing polymers having at least about 0.5% available amine nitrogen and having a basic ionization constant ($K_o$) value between about $10^{-3}$ and $10^{-6}$. The nitrogen-contained moiety of these polymers may be either extra- or intralinear, and may be part of a cyclic or acyclic grouping. Aromatic and heteroaromatic amines however, such as anilines, pyridines and quinolines are not included. The polymers used can be made by any polymerization process, i.e. chain growth (addition) or step growth (condensation, etc.). Another factor of importance equal to that of the actual basic ionization constant is the affinity of the basic polymers for dyestuffs, i.e., the ability to form some type of bond, either specific or non-specific, with the dyes.

It is understood that the basic-nitrogen polymers blended with the polyolefins in accordance with the present invention should not be excessively leachable from the shaped object during the dyeing process. Thus, dye receptors such as low molecular weight fatty amines are leachable to an undesirable extent and tend to migrate from the shaped object into the dyebath and are of no use in binding the dye in the fiber. The presence of leached dye receptor in the dyebath iss highly undesirable since in many cases it forms complexes with the dye, thus making the dye unavailable for dyeing the fiber. In addition, these complexes are frequently insoluble in the dyebath and cause unsightly blotches on the shaped object.

Suitable dye receptor compounds, (B), are exemplified by thermoplastic polymeric amine compounds, including condensation polymers in which the amine group is an integral part of, or pendant from the polymer chain, as well as addition homopolymers and copolymers wherein pendant groups include or consist of amine groups. Examples of polymeric amine compounds particularly useful in this invention are the reaction products of ethylene-maleic anhydride or styrene-maleic anhydride copolymers with an omega-(dialkylamino)alkylamine (wherein the alkyl groups contain from 1 to 5 carbon atoms), the product being an aminoimide [the preparation of such materials have been described by Cohen & Minsh, J. Org. Chem. 24, 1404, (1959)]; the reaction product of M-methyl-(bis-(aminopropyl)amine with 2,4-tolylene diisocyanate, the product being a poly(amino-urea); the reaction products of N-methyl-bis(aminopropyl) amine with dicarboxylic acids ($C_4$ to $C_{12}$), the products being poly(aminoamides); the copolymers of ethylene or styrene with mono- or dialkyl ($C_1$ to $C_5$) aminoalkyl-($C_1$ to $C_5$) acrylates or methacrylates; and water-insoluble derivatives of polyethyleneimine.

The water-insoluble derivatives of polyethyleneimine noted above are the reaction products of an alkylbenzyl halide and polyethyleneimine wherein the alkyl groups contain from 6 to 20 carbon atoms, preferably from 8 to 12 carbon atoms. The degree of substitution upon the nitrogen atoms available for substitution can vary from 15 to 100% depending upon the size of the alkyl group and the final nitrogen percentage desired. The alkyl group can be a straight chain, branched or cyclic hydrocarbon.

A simplified structural formula of those repeating units of polyethyleneimine which are substituted with the alkylbenzyl group is:

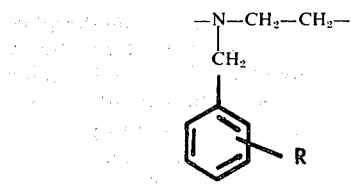

wherein R represents an alkyl group having from six to twenty carbon atoms.

Although the invention is applicable in the range of 1 to 7% content of nitrogen-base polymer in the fiber, it is preferred to employ the range of 1 to 5%, the particular value depending generally upon the nitrogen content and relative basicity of the amine-containing polymer. The latter range is advantageous because of the high cost of nitrogen-base polymers and because it minimizes any undesirable effects on the physical properties and whiteness of the fiber. The presence of 1 to 5% of basic nitrogen polymer in the fiber is usually sufficient to exhaust a 1% owf (on the weight of the fiber) dye bath, which gives deep colors with many dyes. The higher levels of basic nitrogen-containing polymer content permit absorption of much greater (up to 7% owf) amounts of dye by the fiber when desired. It has been found that, in some cases in the practice of this invention, it is possible to obtain excellent dyeability with an as as 0.5% of basic nitrogen (based on total weight) in the fiber although up to 1.5% nitrogen may be used.

The optional or (C) component of the present composition is a copolymer of an alkylene compound such as ethylene, propylene, or butylene and acrylic or methacrylic acid. The acid portion of the polymer may be in free acid form, partially converted to salt or fully converted to salt. Any of the monovalent or divalent metals of Groups I and II of the Periodic Table can be used to form the cation of the salt in the copolymer. However, the monovalent metals such as sodium or potassium are preferred to divalent metals such as zinc because the monovalent metals yield fibers with better physical properties. The acid portion of the copolymer is preferably about 5 to 20% by weight of the copolymer.

The (C) component should be present in the blend in the range of about 1 to 5%, preferably between about 2 and 4%. The molecular weight range of said component can be between about 50,000 and 1,000,000. Although the molecular weight of the (C) component is not critical, it is usually desirable for best processability and physical properties of the shaped article or fiber to have the melt indices of the (A) and (C) components approximately the same.

In order for fiber to possess dyeability of commercial quality, it must be dyeable to deep shades. The mere improvement in dyeability from no dyeability to the ability to attain light shades is wholly insufficient to constitute commercially acceptable dyeability. The present invention produces dyeability to dark shades as well as light shades, using conventional anionic or disperse dyes and conventional dyeing techniques.

The method used to form the blend is not critical provided the polymers of the present invention are homogeneously dispersed throughout the polyolefin. Incomplete mixing results in the formation of aggregates which impair the physical properties of the blend. The blend may be formed by mixing the polymers in granular or powder form in a mixing apparatus followed by extrusion. In general, when forming the mixture by extrusion, the polymers, in granular or powder form, are first mixed by tumbling. A fine powder is preferred as this increases the degree of homogeneity. The mixture of polymers then is extruded at a temperature ranging between 450° and 550°F. In order to insure complete dispersion, it is frequently desirable to pelletize the extruded strand in a strand chopper and re-extrude to form the desired product.

To insure optimum dispersion, the (B) and (C) components may be pre-blended either by tumbling, milling or extruding followed by pelletizing, prior to mixing with the polyolefin (A) component. Melt spinning and drawing of the resultant fiber can be done using any suitable apparatus.

In the present invention it has been determined that dye receptors containing alkyl- or aralkylamino groups, when treated with water-soluble anionic surfactants under acidic conditions show an unexpected specificity in dyeing behavior which depends upon the nature of the acidic group in the surfactant molecule. Surfactants containing only weak-acid groups (e.g. carboxylic) give a profound enhancement of dyeability with anionic dyes, whereas surfactants which contain strong-acid groups (e.g. sulfate, sulfonate, phosphate, polyphosphate) give a profound inhibition of dyeability. Nonionic surfactants have essentially no effect upon dyeability. The following table illustrates this effect.

| Surfactant | Dyeability |
| --- | --- |
| weak-acid | very deep shades |
| strong-acid | very pale shades |
| nonionic | moderately deep shades |
| no surfactant | moderately deep shades |

The present invention is distinguishable over U.S. Pat. No. 3,597,150 noted above, because said application is limited to vinylpyridine polymer dye receptors and discloses enhancement of dyeability as a result of treatment with all anionic surfactants, whereas the present invention is limited solely to the alkyl- or aralkylamine polymers specified herein and enhancement of dyeability is achieved only by treatment with weak acid surfactants. Surprisingly the strong acid surfactants are not only ineffective in enhancing dyeability but inhibit dyeability.

The anionic surfactants used in accordance with the process of the present invention to produce inhibition of dyeability have the general formula (R—A) wherein R represents a hydrophobic group which is a substituted or unsubstituted alkyl, aryl or alkylaryl group in which the total number of carbon atoms in said groups is 6 or more, preferably between 10 and 40, per A group, in addition R may also contain a polyoxyalkylene group; and A is an anionic group the acid form of which has an acid dissociation constant greater than about $10^{-3}$ and exemplified by one or more of the following: (1) sulfonate; (2) sulfate; (3) phosphate or (4) polyphosphate; etc. The A group can be in the free acid form or in the salt form. It is to be understood that additional materials which are operative in this invention to inhibit dyeability are those which generate strong-acid anionic surfactants in situ during the process of this invention.

The anionic surfactants used in accordance with the process of the present invention to produce an enhancement of dyeability have the general formula (R—A) wherein R represents a hydrophobic group which is a substituted or unsubstituted alkyl, aryl, or alkylaryl group in which the total number of carbon atoms in said groups is 6 or more, preferably between 10 and 40, per A group and also must contain sufficient polar groups such as polyoxyethylene groups, so that the surfactant remains water soluble under the acidic conditions of treatment, and A is an anionic group, the acid form of which has an acid dissociation constant between $10^{-4}$ and $10^{-6}$ and is exemplified by a carboxylate. The A group can be in the free acid form or in the salt form. It is to be understood that additional materials which are operative in this invention to enhance dyeability are those which generate weak-acid anionic surfactants in situ during the process of this invention.

The materials used to enhance dyeability in accordance with the present invention are those which remain water-soluble at the pH of the treatment, since maintaining water solubility precludes excessive deposition of the surfactant upon the shaped article or fiber which in turn would cause uneven dyeing.

The influence upon dyeability which is within the scope of the present invention is a function of the amount of anionic surfactants absorbed by the article or fiber prior to or during the dyeing step. It has been determined that the use of generally between about 0.5 and 32% weight percent of an anionic surfactant on the shaped article or fiber as described herein results in increased or reduced dyeability depending upon the surfactant type with acid type dyes of such article or fiber.

The perferred range of anionic surfactant absorbed by the article or fiber treated which results in the greatest influence upon dyeability is between about 1.0 and 5 weight percent.

The anionic surfactant may be applied to the article of fiber prior to, or during the dyeing process. The concentration of the anionic surfactant when applied prior to dyeing or in the dyebath, depending upon when it is applied, will vary between about 1.0 and 32 weight percent.

Examples of anionic surfactants suitable for use in the present invention to inhibit dyeability are found in U.S. Pat. NO. 3,380,927 the contents of which are included herein. Others are:

| Name or Trademark | Chemical Name or Formula |
| --- | --- |
| Sodium laurylsulfate | Sodium dodecylsulfate |
| Sodium cetylsulfate | Sodium hexadecylsulfate |
| Aerosol OT | Dioctyl ester of sodium sulfosuccinic acid |
| Aerosol TR | Bis(tridecyl) ester of sodium sulfosuccinic acid |
| Nacconol NRSF | Sodium dodecylbenzene sulfonate |
| Tergitol 15-S-3A | $C_{13}H_{27}O-(CH_2-CH_2-O)_3-SO_3NH_4$ |
| Victawet 35B | Aliphatic phosphate ester: $(2\text{-ethylhexyl})_3-Na_5(P_3O_{10})_2$ Diethanol amine salt of 1:1 Mixture of mono- and difatty alcohol phosphates (made from the fatty alcohols plus $P_2O_5$) |
| Zelek NK | Fatty alcohol phosphate |

Those compounds which enhance dyeability are: Sandopan DTC - 100, Valdet 79N, Sandopan 6624, Alkypo NP. These compounds have as the active ingredient varying compositions which are included within the general formula: $C_nH_{2n+1}B-O-(CH_2-CH_2-O)_x-CH_2-COOZ$ wherein B is an aryl group or nothing, Z is hydrogen, sodium or potassium and the ratio of $n$ to $x$ is from .5 to 1 to 3 to 1. Preferred compounds to be used are $C_{12}H_{25}O-(CH_2-CH_2O)_7-CH_2-COONa$ and

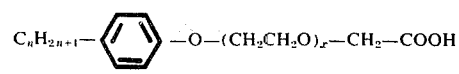

wherein the ratio of $n$ to $x$ is from 5:1 to 3:1.

The anionic surfactant is preferably applied either in an aqueous dyebath or in an aqueous paste i.e. in a printing or pad-dyeing process. There are no critical limitations which must be observed when applying the anionic surfactant to the shaped article or fiber, with the exception that the dyeing treatment must be carried out under acidic conditions, and the article or fiber must not be exposed to conditions which would wash out the surfactant prior to dyeing.

The surfactants used in the present invention may be added to an acidic dyebath containing a mineral or organic acid, such as sulfuric acid, phosphoric acid, formic acid or acetic acid, and an anionic dyestuff, such as an acid, metallized or direct dyestuff, at a pH between 0 and 5 and preferably between 1 and 4.

Another aspect of the present invention relates to a process for dyeing fabrics and textile articles made from polyolefin fibers to two-color or multi-color patterns with two different anionic dyes.

The advantages of obtaining a multicolor effect in a single dyeing procedure, as compared in predyeing the individual color components in a number of separate dyeing steps are obvious. One of the chief advantages is flexibility in eliminating the necessity for warehousing the variety of colors needed to assemble the final textile articles from predyed components. Synthetic fibers other than the polyolefins, such as those made from polyamides or polyacrylonitriles, can be modified to permit the achievement of multi-color effects in a single dyeing procedure. Polyolefin fibers however, which in some respects offer better properties than the aforementioned fibers, are not available in forms which can be dyed to a multi-color effect using a single dyeing process with two dyes of the same class.

U.S. Pat. No. 3,622,264 to C. N. Brown and A. Schwarz describes a method for producing a multicolor effect with polyolefin fibers, but this requires the use of two different classes of surfactants, i.e. anionic and nonanionic surfactants and two different classes of dyes, i.e. an anionic dye and a disperse dye. In the practice of the present invention, however, multicolor effects can be obtained with two anionic dyes.

It is important to be able to dye modified poly-alpha-monoolefin fibers with the large class of anionic dyes. These dyes are fixed in the fiber mainly with primary forces and consequently such dyed fibers show excellent fastness properties. Although blends of poly-alpha-monoolefins and nitrogen polymers are dyeable with disperse dyes, such dyes are held in the fiber only by means of secondary forces. Such dyed fibers show poor fastness properties, such as low fastness to light and to dry cleaning.

Textile articles which contain two different types of anionic dye-receptive polyolefin yarns (Yarns A and B) can be produced by weaving, knitting etc. If Yarn A contains a polyvinylpyridine-type dye receptor, and Yarn B contains an alkylamine-containing dye receptor system as described herein, and such yarns are formed into an article which is dyed in a dyebath containing an anionic dye (dye 1) and a strong-acid type surfactant, only the Yarn A component of the article will accept dye. The article is then rinsed, and placed in another dyebath containing a second anionic dye, (dye 2) and a weak-acid type surfactant. In this case both yarns accept dye. Conditions can be selectively set such that Yarn B accepts most of the dye if the dye receptive capacity of Yarn A has already been largely exhausted by its acceptance of dye in the first dyebath.

The mono- and polycyclic pyridine base dye receptor polymer admixed with the polyolefin to form the fibers used in the yarns denoted A is present either as a homopolymer or a copolymer with another monomer copolymerizable therewith including random, alternating, block, graft copolymers, etc. The mono- and polycyclic pyridine base dye receptor polymers used are those based, for example, on monovinylpyridines and monovinylquinolines.

The monovinylpyridines useful in making the above named dye-receptive polymers employed in the invention include 2-vinylpyridine, 3-vinylpyridine, 4-vinylpyridine, 5-methyl-2-vinylpyridine, 2-ethyl-5-vinylpyridine, 2-methyl-5-vinylpyridine, 2-ethyl-6-vinylpyridine, 2-isopropenylpyridine, etc. Polymerizable olefinic monomers with which the monovinylpyridine may be copolymerized include acrylic and methacrylic esters typified by ethyl acrylate and methyl methacrylate; vinylaryl hydrocarbons typified by styrene and vinyltoluenes; and 1,3-butadiene. Alternatively, the monovinylpyridine may be graft-copolymerized, by well-known methods, with a previously formed linear high polymer, typified by polyethylene, polypropylene, poly(ethylene terephthalate), polystyrene, and polybutadiene.

Although the invention is applicable in the range of 0.5 to 10% (by weight of fiber) content of pyridine-containing polymer in the fiber, it is preferred to employ the range of 1 to 5%, the particular amount depending upon the nitrogen content. This lower range is advantageous because of the high cost of the pyridine-containing polymers and because it minimizes any undesirable affects on the physical properties of the fiber. The presence of 1 to 5% of pyridine-containing polymer in the fiber is usually sufficient to exhaust a 1 or 3% owf (on the weight of the fiber) dyebath, each of which gives deep colors with most dyes. It has been determined that at least 3% pyridine base polymer should be blended with a polyolefin if commerical dyeability of the resulting fiber is to be obtained, however lesser amounts can be used if desired. In terms of the actual nitrogen content of the fiber, a minimum of 0.13% nitrogen in the fiber is required. The optimum properties are obtained when the range is between about 0.25 and 0.50% nitrogen (weight percent of pyridinic nitrogen in the fiber).

In addition to the components listed above, the fiber may also contain between about 0.5 and 5% of a hydrophilic compound which is either a homopolymer of ethylene oxide, ether or ester derivatives thereof, or a copolymer of ethylene oxide. The presence of these compounds in polyolefin fiber allows the use of lesser amounts, as little as 1%, of pyridine base dye receptors.

The ratio of dyestuff absorbed by Yarns A and B in the complete dyeing process is subject to additional control by: (1) the relative amounts of dye receptors in Yarns A and B which govern the maximum dye receptivity of the yarns, and (2) by the relative amounts of strong-acid surfactant used in the first dyebath and weak-acid surfactant used in the second dyebath.

Of course, more than two colors can be obtained in textile articles by the use of a third type of dye-receptive yarn and another class of dyestuff. For example, a third yarn (C) which is receptive only to disperse dyes such as polyolefin yarns containing styrene-acrylonitrile copolymers or other non-basic dye receptors can be incorporated into a textile article. In this case, a disperse dyestuff (dye 3) is added to either the first or second dyebath.

Upon completion of the dyeing process, Yarn A will contain mostly dye 1 and dye 3; Yarn B will contain mostly dye 2 and dye 3; Yarn C will contain only dye 3.

Any of the fibers of the present invention may be scoured if desired, and dyed by immersion in a dye bath. It is a feature of the present composition of matter that it may be dyed by many types of dyes. Dyes particularly suitable for use with this invention are the acid dyes, i.e., those in which the color bodies are anionic. This includes a number of catagories of dyes, one of which is the strong acid dyes, typified by the following:

Acid Blue 80 (C.I. No. 61585)
Acid Yellow 23 (C.I. No. 19140)
Acid Orange 7 (C.T. No. 15510)
Acid Red 73 (C.I. No. 27290)
Acid Blue 45 (C.I. No. 63010)
Acid Blue 78 (C.I. No. 62105)
Acid Blue 62 (C.I. No. 62045)

Another category of anionic dyes is the acid metallized tyes, typified by:

Acid Yellow 54 (C.I. No. 19010)
Acid Orange 72 (C.I. No. 18740)
Acid Red 186 (C.I. No. 18740)
Acid Blue 158 (C.I. No. 14880)
Acid Red 212

Still another category of anionic dyes is the neutral metallized dyes typified by the following:

Acid Yellow 121 (C.I. No. 18690)
Acid Orange 60 (The half-chrome complex of 1-phenyl-3-methyl-4-(2-hydroxy-5-sulfamoyl phenylazo)-5-pyrazolone)
Acid Red 209
Acid Blue 168

Still another category of anionic dyes is the direct dyes, typified by the following:

Direct Yellow 44 (C.I. No. 29000)
Direct Red 13 (C.I. No. 22155)
Direct Blue 67 (C.I. No. 27925)

Other categories of anionic dyes which are applicable to the invention are the reactive dyes, typified by Reactive Orange 1, and the mordant acid dyes, typified by Mordant Red 3 (C.I. No. 58005).

The products are also highly dyeable with disperse dyes, typified by Disperse Yellow 23 (C.I. No. 26070), Disperse Blue 1 (C.I. No. 64500) and Disperse Red 13 (C.I. No. 11115).

In order to disclose more clearly the nature of the present invention, specific examples of the practice of the invention are hereinafter given. It should be understood, however, that this is done solely by way of example and is intended neither to delineate the scope of the invention nor limit the ambit of the appended claims.

The term "phr" means "parts per hundred of the resin".

In order to illustrate more concretely the great improvement in dyeability brought about by the treatment with a weak acid surfactant of amine-containing polymer dye receptor optionally containing an alkylene-acrylic acid copolymer in polyolefin and polyester, the color intensities of some samples were instrumentally measured in comparison with controls which were not treated with surfactant.

For this purpose, the treated and dyed fibers were ground in a Wiley mill to pass a No. 40 screen, compressed at 78 p.s.i., and their reflectances measured in a Model D-1 Color-Eye Colorimeter (manufactured by Instrument Development Laboratories, Inc. Attleboro, Mass.). The measurement was made with a Y tristimulus filter and the reflectances corrected to C.I.E. values.

Since reflectance decreases as color intensity increases, the corrected readings were converted by means of their reciprocals to an I value which is directly proportional to color intensity, by the following formula:

$$"I" = \frac{1}{C.I.E. \text{ reflectance } (Y)} \times 1,000$$

These values are listed in the examples. C.I.E. is an abbreviation of Commission Internationale D'Eclairage (The International Committee on Illumination).

EXAMPLE I

Polypropylene fibers containing 2 phr (parts per hundred) of styrene-dimethylaminopropyl maleimide copolymer and 4 phr of a copolymer of ethylene and 13 weight % methacrylic acid wherein approximately 50% of the carboxyl groups were in the sodium salt form and prepared using the method described in U.S. Pat. No. 3,659,009 R. W. Fuest and M. Farber.

Samples of the above fiber were prescoured for 40 minutes in an alkaline bath, rinsed with water, then dyed for 1 hour at 210°–212°F. in a dyebath containing 3% owf dyestuff, 9% owf acetic acid, and 5% owf surfactant. The visual color intensities (vis) and I values (I val) of the dyed samples using various surfactants are listed in Table 1.

TABLE 1

| Commercial Name or Trademark | Chemical Name or Formula | Type | Dyed Sample Color Intensity | | | |
|---|---|---|---|---|---|---|
| | | | Dye A | | Dye B | |
| | | | vis | "I" val | vis | "I" val |
| Sodium lauryl sulfate | $C_{12}H_{25}SO_4Na$ | SA | VL | 46.9 | VL | 26.4 |
| Sodium tetradecyl sulfate | $C_{14}H_{29}SO_4Na$ | SA | VL | 44.2 | VL | 28.7 |
| Aerosol OT | Dioctyl ester of sodium sulfosuccinic acid | SA | VL | 53.8 | VL | 31.9 |
| Barisol Super BRM | Aliphatic Phosphated ester | SA | L | 57.2 | L | 49.3 |
| Zelek NK | Fatty alcohol phosphate | SA | VL | 53.3 | L | 48.9 |
| No Surfactant | — | — | D | 89.7 | D | 71.0 |
| Triton X-100 | Octylphenol- | | | | | |

TABLE 1-continued

| Commercial Name or Trademark | Chemical Name or Formula | Type | Dye A vis | Dye A "I" val | Dye B vis | Dye B "I" val |
|---|---|---|---|---|---|---|
| Triton X-45 | $(CH_2-CH_2-O)_{30}-H$ | N | D | 87.3 | D | 69.7 |
| Tergitol 15-S-9 | Octylphenol-$(CH_2-CH_2O)_5H$ | N | D | 85.6 | D | 69.9 |
| Sandopan DTC-100 | Tridecyl—O—$(CH_2-CH_2-O)_9H$ | N | D | 88.2 | D | 70.3 |
| | approx. 1:1 weight mixture of $C_{12}H_{25}O(CH_2CH_2O)_7CH_2COO$ Na and $C_{12}H_{25}(CH_2CH_2O)_7-H$ | C | VD | 141.0 | VD | 150 |
| Sandopan 6624 | $C_{12}H_{25}-O-(CH_2CH_2-O)_7-CH_2CCO$ Na | C | VD | 181 | VD | 176 |
| Valdet 79N | — | C | VD | 185 | VD | 152 |
| Akypo NP | $C_nH_{2n}$-⬡-$(OCH_2CH_2)-CCH_2COCH_2$ | C | VD | 173 | VD | 147.3 |

Legend:
RA - strong-acid anionic
C - carboxylic anionic
N - nonionic
Dye A Acid Orange 60
Dye B Acid Blue 78

L = light
D = dark
V = very

EXAMPLE II

Polypropylene fibers containing 4 phr of a terpolymer of styrene, methylvinylether, and dimethylaminopropyl maleimide were prepared by the method in U.S. Pat. No. 3,585,256 Ronald W. Fuest.

Samples of this fiber were dyed by the method of Example I with various surfactants in the dyebath.

and various amounts of the ethylene-methacrylic acid copolymer half sodium salt described in Example I were prepared and meltspun into fiber by the technique described in U.S. Pat. No. 3,659,009 (R. W. Fuest and M. Farber). Skeins of the fibers were dyed according to the procedure of Example I with 3% owf Acid Blue 78.

SAM = 1:1 styrene-dimethylaminopropyl maleimide copolymer

TABLE 2

| Commercial Name or Trademark | Chemical Name or Formula | Type | Dye A vis | Dye A "I" val | Dye B vis | Dye B "I" val |
|---|---|---|---|---|---|---|
| Barisol Super BRM | Aliphatic phosphated ester | SA | VL | 26.8 | VL | 30.2 |
| Aerosol OT | Dioctyl ester of sodium sulfo-succinic acid | SA | VL | 32.2 | VL | 27.3 |
| Alkapent CC | Aliphatic phosphated ester, acid form | SA | VL | 38.9 | VL | 41.9 |
| No surfactant | — | | D | 101.5 | D | 91.2 |
| Triton X-100 | Octylphenol—$(CH_2)-CH_2O)_{30}H$ | N | D | 97.7 | D | 82.4 |
| Sandopan 6624 | $C_{12}H_{25}O-(CH_2CH_2-O)_7-CH_2-COONa$ | C | VD | 289 | VD | 264 |
| Valdet 79N | | C | VD | 223 | VD | 217 |

Legend:
SA - strong-acid anionic
C - carboxylic anionic
N - nonionic
Dye A - Acid Orange 60
Dye B - Acid Blue 78

L = light
D = dark
V = very

EXAMPLE III

Blends of polypropylene with various amounts of the styrene-dimethylaminopropyl maleimide copolymer EMAA = ethylene - 13% methacrylic acid copolymer half-sodium salt.

| Amount SAM (phr) | Amount EMAA (phr) | Surfactant A Visual | Surfactant A "I" value | No Surfactant Vis. | No Surfactant "I" value | Surfactant B Vis. | Surfactant B "I" value |
|---|---|---|---|---|---|---|---|
| 5 | 0 | VL | 42.5 | VL | 24.7 | VL | 20.2 |
| 2 | 0 | VL | 52.2 | VL | 37.0 | VL | 22.5 |
| 5 | 5 | VD | 266 | VD | 280 | L | 59.8 |
| 3 | 3 | VD | 217 | M | 132 | VL | 29.8 |

-continued

| Amount SAM (phr) | Amount EMAA (phr) | Surfactant A Visual | "I" value | No Surfactant Vis. | "I" value | Surfactant B Vis. | "I" value |
|---|---|---|---|---|---|---|---|
| 2 | 4 | VD | 235 | L-M | 66.7 | VL | 26.4 |

Legend:
Surfactant A = Sandopan DTC 100 (5% owf)
Surfactant B = Sodium lauryl sulfate (5% owf)
L = light
M = medium
D = dark
V = very

EXAMPLE IV

This example illustrates the utility of the present invention in producing a two-color or variegated affect with two anionic dyes.

A 1-gram sample of a polypropylene fiber containing 3 phr of a polyvinylpyridine dye receptor (a copolymer of 2-vinylpyridine and 2-methyl-5-vinylpyridine (prepared by suspension polymerization using azo-bis-isobutyronitrile as initiator)(Fiber A) and a one-gram sample of a polypropylene fiber containing 3 phr of styrene-dimethylaminopropylmaleimide copolymer and 3 phr of ethylene-methacrylic acid copolymer half-sodium salt (Fiber B) were fastened together and pre-scoured in a 1% owf (on the weight of the fiber) sodium carbonate solution for 20 minutes at 180°F.

The combined fiber samples were then dyed in an aqueous dyebath containing 3% owf formic acid, 1.5% owf Acid Orange 60, and 5% owf Barisol Super BRM for one hour at 210°–212°F., then postscoured for 10 minutes with distilled water at 160°F. The color of Fiber A was a deep orange, Fiber B was virtually colorless. The combined fibers were then placed in another dyebath containing 3% owf formic acid, 0.75% owf Acid Blue 78, and 5% owf Sandopan 6624. The fibers were dyed at 210°–212°F. for one hour, then postscoured as above. The color of Fiber A was a deep brown, and the color of Fiber B was a deep grayish-blue.

In another experiment using the same procedure and combination of fibers, except that in the first dyebath 1.5% owf Acid Red 186 (C.I. No. 18740) was used instead of Acid Orange 60, the color of Fiber A at the end of the process was a deep purple and the color of Fiber B was a deep blue-violet.

EXAMPLE V

Samples of a fiber similar to that described in Example I, but containing 2 phr of styrene-dimethylaminopropylmaleimide and 2 phr of ethylene-13% methacrylic acid copolymer half-sodium salt were dyed in dyebaths containing 3% owf Acid Orange 60, 9% owf acetic acid and various levels of either sodium lauryl sulfate (Surfactant A) or Sandopan DTC-100 (Surfactant B).

| Surfactant A Level (owf) | Color Intensity (Visual) |
|---|---|
| 0 | L-M |
| 0.5 | L |
| 1 | L |
| 2 | VL |
| 4 | VL |
| 8 | VL |
| 15 | VL |
| Surfactant B | |
| 0 | L-M |
| 0.5 | L-M |
| 1 | M-D |
| 2 | D |
| 4 | VD |
| 8 | VD |
| 10 | VD |
| 20 | VD |

L=light;
M=medium;
D=dark;
V=very

EXAMPLE VI

A polypropylene fiber containing 5 phr of an ethylene-30% dimethylaminoethyl methacrylate copolymer as described in U.S. Pat. No. 3,395,198 and 2 phr of a commercial copolymer of 87% ethylene and 13% methacrylic acid half-sodium salt was prepared by the method described in U.S. Pat. No. 3,659,009 R. W. Fuest and M. Farber. Skeins of this fiber were dyed by the method described in Example I with 3% owf Acid Orange 60 and 3% owf Acid Blue 78.

| Surfactant | Acid Blue 78 Visual | "I" val | Acid Orange 60 Visual | "I" val |
|---|---|---|---|---|
| 10% owf Sandopan DTC-100 | VD | 201 | VD | 189 |
| No Surfactant | M | 120 | D | 87.6 |
| 4% owf Sodium lauryl sulfate | VL | 45.7 | VL | 32.3 |

L = light; M = medium; D = dark; V = very

EXAMPLE VII

Polypropylene fibers containing various levels of an ethylene-30% dimethylaminoethyl methacrylate copolymer prepared as in U.S. Pat. 3,395,198 were formed using the method described in U.S. Pat. No. 3,659,009 R. W. Fuest and M. Farber. Skeins of these fibers were dyed by the method described in Example I with 3% owf Acid Blue 78 with the surfactants shown in the table.

TABLE

| Surfactant | Color Intensity amount of nitrogen-containing polymer | | |
|---|---|---|---|
| | 3 phr | 5 phr | 7 phr |
| 10% owf Sandopan DTC-100 | L | M | VD |
| No Surfactant | L | L-M | D |
| 4% owf Sodium | | | |

TABLE-continued

| Surfactant | Color Intensity amount of nitrogen-containing polymer | | |
|---|---|---|---|
| | 3 phr | 5 phr | 7 phr |
| lauryl sulfate | VL | VL | L |

L = light; M = medium; D = dark; V = very

EXAMPLE VIII

Portions of the fiber used in Examples I and VII were texturized, tufted into carpets and scoured. The following printing pastes were then made up:

| | A | B |
|---|---|---|
| Crocein Scarlet SS (Acid Red 73, C.I. No. 27090) | 3% | 3% |
| Hydroxyethylcellulose | 6 | 6 |
| Formic Acid | 5 | 5 |
| Sodium Lauryl Sulfate | 2.5 | — |
| Sandopan 6624 | — | 2.5 |
| Water | 83.5 | 83.5 |

Samples of the carpets were printed with the above pastes, heated at 212°F. by steam in a closed chamber and scoured. The printed patterns made with paste B were bright red and sharply defined. Those made with paste A were very light in color. Dark prints could also be obtained with B-type formulations using other anionic dyes, such as Acid Blue 25, Acid Red 186 and Acid Yellow 121.

Throughout the discussion presented herein, the expression "anionic surfactant" is used as a contraction of "anionic surface active agent" which is a compound that alters the surface tension of a liquid in which it is dissolved. A detailed discussion of surfactants in general and anionic surfactants in particular is found in the book entitled *Surface Active Agents, Their Chemistry and Technology* by Schwartz and Perry, Interscience Publishers, New York 1949 and contents of which are hereby incorporated by reference herein. It is emphasized that the anionic surfactants disclosed herein as enhancing dyeability must possess surfactant properties. Thus compounds such as stearic and oleic acids etc. are not suitable for use in the present invention because although they each possess a hydrophobic portion and a hydrophilic (—COOH) group, they are not water soluble and do not alter the surface tension of the dyebath or solution in which each is placed.

If either stearic or oleic acids are used in accordance with the present invention it has been found that an undesirable oily or greasy film is imparted to the surface of the shaped article. Also, the composition is not dyeable with anionic dyes after treatment with said acids because they are not present in sufficient concentration under conditions of the present invention to render the composition dyeable.

I claim:

1. A method of selectively controlling the degree of dyeability with anionic dyes of a shaped article comprising:
   A. between about 93 and 99% of a polyolefin
   B. between about 1 and 7% of a thermoplastic, thermostable, extra-or intralinear polymeric alkyl or aralkyl amine having a $K_b$ value between $10^{-3}$ and $10^{-6}$, said amine-containing polymer being capable of binding anionic and disperse dyes; said method comprising contacting said composition prior to absorption of an anionic dye by said shaped article with an anionic surfactant selected from the group consisting of
   D. a strong acid water soluble anionic surfactant having the general formula (R—A), wherein R is an alkyl, aryl, alkylaryl or polyoxyalkylene group having from about 6 to 40 carbon atoms per A group, and A is an anionic group, the acid form of which has an acid dissociation constant greater than about $10^{-3}$, said surfactant treatment resulting in inhibition of dyeability and
   E. a weak acid anionic surfactant which is water soluble at a pH less than 7 and which has the general formula (R—A) wherein R is an alkyl, aryl, alkylaryl or polyoxyethylene group having from about 6 to 40 carbon atoms per A group, and A is an anionic group the acid form of which has an acid dissociation constant of between about $10^{-4}$ and $10^{-6}$, said treatment resulting in increased dyeability with anionic dyes.

2. The method defined in claim 1 wherein the shaped article is a melt extruded fiber, or film which is capable of being formed into a fiber.

3. The method defined in claim 2 wherein said polyolefin is selected from the group consisting of polyethylene, polypropylene, poly(3-methyl-1-butene), poly(4-methyl-1-pentene), and the copolymer of propylene and 3-methyl-1-butene.

4. The method defined in claim 2 wherein (B) is selected from the group consisting of:
   a. the respective reaction products of ethylene-maleicanhydride copolymer with an omega-(dialkylamino)alkyl amine wherein the alkyl groups contain 1 to 5 carbon atoms;
   b. the respective reaction products of styrene-maleicanhydride copolymer with an omega-(dialkylamino)alkylamine wherein the alkyl groups contain 1 to 5 carbon atoms;
   c. the respective reaction products of N-methyl-bis-(aminopropylamine) with 2,4-tolylene diisocyanates;
   d. the respective reaction products of N-methyl-bis-(aminopropylamine) with dicarboxylic acids having 4 to 12 carbon atoms;
   e. the respective copolymers of ethylene and a monoor dialkylaminoalkyl acrylate wherein the alkyl groups contain 1 to 5 carbon atoms;
   f. the respective copolymers of styrene and a monoor dialkylaminoalkyl acrylate wherein the alkyl groups contain 1 to 5 carbon atoms;
   g. the respective copolymers of ethylene and a monoor dialkylaminoalkyl methacrylate wherein the alkyl groups contain 1 to 5 carbon atoms;
   h. the respective copolymers of styrene and a monoor dialkylaminoalkyl methacrylate wherein the alkyl groups contain 1 to 5 carbon atoms;
   i. a terpolymer of styrene, methyl-vinyl ether and dimethylaminopropyl maleimide; and
   j. water insoluble alkylbenzyl adducts of polyethyleneimine wherein the alkyl groups contain 6 to 20 carbon atoms.

5. The method defined in claim 3 wherein (B) is selected from the group consisting of
   a. the reaction products of ethylene-maleicanhydride copolymer with an omega-(dialkylamino)alkylamine wherein the alkyl groups contain 1 to 5 carbon atoms;

b. the reaction products of styrene-maleicanhydride copolymer with an omega-(dialkylamino)alkylamine wherein the alkyl groups contain 1 to 5 carbon atoms;

c. the reaction products of N-methyl-bis(aminopropylamine) with 2,4-tolylene diisocyanates;

d. the reaction products of N-methyl-bis(aminopropylamine) with dicarboxylic acids having 4 to 12 carbon atoms;

e. the copolymers of ethylene and a mono- or dialkylaminoalkyl acrylate wherein the alkyl groups contain 1 to 5 carbon atoms;

f. the copolymers of styrene and a mono- or dialkylaminoalkyl acrylate wherein the alkyl groups contain 1 to 5 carbon atoms;

g. the copolymers of ethylene and a mono- or dialkylaminoalkyl methacrylate wherein the alkyl groups contain 1 to 5 carbon atoms;

h. the copolymers of styrene and a mono- or dialkylaminoalkyl methacrylate wherein the alkyl groups contain 1 to 5 carbon atoms;

i. water insoluble alkylbenzyl adducts of polyethyleneimine wherein the alkyl groups contain 6 to 20 carbon atoms;

j. a terpolymer of styrene, methylvinylether and dimethylaminopropyl maleimide.

6. The method defined in claim 5 wherein the dyeability of said fiber or film is enhanced as a result of being contacted with between about 0.5 and 32% by weight of a weak acid type anionic surfactant wherein the anionic group is a carboxyl group.

7. The method defined in claim 6 wherein said fiber or film is contacted with said surfactant prior to the dyeing step.

8. The method defined in claim 6 wherein said fiber or film is contacted with said surfactant during the dyeing step.

9. The method defined in claim 5 wherein the dyeability of said fiber or film is inhibited as a result of being contacted with between about 0.5 and 32% by weight of a strong acid type anionic surfactant either before or during the dyeing process wherein the anionic group is selected from the group consisting of (1) sulfonate (2) sulfate (3) phosphate (4) polyphosphate.

10. The method defined in claim 6 wherein said anionic surfactant has the general formula $C_nH_{2n+1}$—B—O—$(CH_2$—$CH_2$—O$)_x$$CH_2$—COOZ wherein B is phenyl or nothing; Z is hydrogen, sodium or potassium, and the ratio of n to x is from .5:1 to 3:1.

11. The method defined in claim 6 wherein the fiber or film is contacted with said anionic surfactant which is in paste form.

12. The method defined in claim 9 wherein the fiber or film is contacted with said anionic surfactant which is in paste form.

13. The method defined in claim 6 wherein (A) is polypropylene, (B) is the reaction product of a 1:1 styrenemaleic anhydride copolymer with (dimethylamino)-propylamine.

14. The method defined in claim 6 wherein (A) is polypropylene, (B) is the reaction product of a 1:1 ethylene-maleic anhydride copolymer with (dimethylamino)propylamine.

15. The method defined in claim 6 wherein (A) is polypropylene, (B) is the reaction product of N-methylbis-(aminopropylamine) with 2,4-tolylene diisocyanate.

16. The method defined in claim 6 wherein (A) is polypropylene, (B) is the reaction product of N-methylbis-(aminopropylamine) with adipic acid.

17. The method defined in claim 6 wherein (A) is polypropylene, (B) is a copolymer of ethylene and dimethylaminoethyl acrylate.

18. The method defined in claim 6 wherein (A) is polypropylene, (B) is a copolymer of styrene and diethylaminoethyl acrylate.

19. The method defined in claim 6 wherein (A) is polypropylene, (B) is a copolymer of ethylene and diethylaminoethyl acrylate.

20. The method defined in claim 6 wherein (A) is polypropylene, (B) is a copolymer of styrene and dimethylaminoethyl acrylate.

21. The method defined in claim 6 wherein (A) is polypropylene, (B) is a copolymer of ethylene and dimethylaminoethyl methacrylate.

22. The method defined in claim 6 wherein (A) is polypropylene, (B) is a copolymer of styrene and dimethylaminoethyl methacrylate.

23. The method defined in claim 6 wherein (A) is polypropylene, (B) is an alkylbenzyl adduct of polyethyleneimine wherein the alkyl groups contain 8 to 12 carbon atoms.

24. A method defined in claim 1 wherein said shaped article contains between about 90% and 98% of component (A), between about 1 and 5% of component (B) and (C) between about 1 and 5% of a copolymer formed from an alkylene compound having between about 1 and 5 carbon atoms and acrylic or methacrylic acid or salts thereof, said copolymer having a melt index between about 0.5 and 20.

25. The method defined in claim 24 wherein the shaped article is a melt extruded fiber, or film which is capable of being formed into a fiber.

26. The method defined in claim 25 wherein said polyolefin is selected from the group consisting of polyethylene, polypropylene, poly(3-methyl-1-butene), poly(4-methyl-1-pentene), and the copolymer of propylene and 3-methyl-1-butene.

27. The method defined in claim 25 wherein (B) is selected from the group consisting of:

a. the reaction products of ethylene-maleicanhydride copolymer with an omega-(dialkylamino)alkyl amine wherein the alkyl groups contain 1 to 5 carbon atoms;

b. the reaction products of styrene-maleicanhydride copolymer with an omega-(dialkylamino)alkylamine wherein the alkyl groups contain 1 to 5 carbon atoms;

c. the reaction products of N-methyl-bis(aminopropylamine) with 2,4-tolylene diisocyanate;

d. the reaction products of N-methyl-bis(aminopropylamine) with dicarboxylic acids having 4 to 12 carbon atoms;

e. the copolymers of ethylene and a mono- or dialkylaminoalkyl acrylate wherein the alkyl groups contain 1 to 5 carbon atoms;

f. the copolymers of styrene and a mono- or dialkylaminoalkyl acrylate wherein the alkyl groups contain 1 to 5 carbon atoms;

g. the copolymers of ethylene and a mono- or dialkylaminoalkyl methacrylate wherein the alkyl groups contain 1 to 5 carbon atoms;

h. the copolymers of styrene and a mono- or dialkylaminoalkyl methacrylate wherein the alkyl groups contain 1 to 5 carbon atoms;

i. water insoluble alkylbenzyl adducts of polyethyleneimine wherein the alkyl groups contain 6 to 20 carbon atoms; and j. terpolymer of styrene, methylvinylether and dimethylaminopropyl maleimide.

28. The method defined in claim 25 wherein (C) is selected from the group consisting of:
   a. copolymers of ethylene and between 5 and 20 weight percent acrylic acid;
   b. copolymers of ethylene and between 5 and 20 weight percent methacrylic acid;
   c. copolymers of ethylene and between 5 and 20 weight percent acrylic acid wherein the acid portion of said copolymer is fully or partially converted to a salt, the cation of said acid salt being a mino- or divalent metal from Group 1 or II of the Periodic Table;
   d. copolymers of ethylene and between 5 and 20 weight percent methacrylic acid wherein the acid portion of said copolymer is fully or partially converted to a salt, the cation of said acid salt being a mono- or divalent metal from Group I or II of the Periodic Table.

29. The method defined in claim 26 wherein (B) is selected from the group consisting of:
   a. the reaction products of ethylene-maleicanhydride copolymer with an omega-(dialkylamino)alkylamine wherein the alkyl groups contain 1 to 5 carbon atoms;
   b. the reaction products of styrene-maleicanhydride copolymer with an omega-(dialkylamino)alkylamine wherein the alkyl groups contain 1 to 5 carbon atoms;
   c. the reaction products of N-methyl-bis(aminopropylamine) with 2,4-tolylene diisocyanate;
   d. the reaction products of N-methyl-bis(aminopropylamine) with dicarboxylic acids having 4 to 12 carbon atoms;
   e. the copolymers of ethylene and a mono- or dialkylaminoalkyl acrylate wherein the alkyl groups contain 1 to 5 carbon atoms;
   f. the copolymers of styrene and a mono- or dialkylaminoalkyl acrylate wherein the alkyl groups contain 1 to 5 carbon atoms;
   g. the copolymers of ethylene and a mono- or dialkylaminoalkyl methacrylate wherein the alkyl groups contain 1 to 5 carbon atoms;
   h. the copolymers of styrene and a mono- or dialkylaminoalkyl methacrylate wherein the alkyl groups contain 1 to 5 carbon atoms;
   i. water insoluble alkylbenzyl adducts of polyethyleneimine wherein the alkyl groups contain 6 to 20 carbon atoms; and
   j. terpolymers of styrene, methylvinylether and dimethylamino-propyl maleimide;

and (C) is selected from the group consisting of:
   a. copolymers of ethylene and between 5 and 20 weight percent acrylic acid;
   b. copolymers of ethylene and between 5 and 20 weight percent acrylic acid wherein the acid portion of said copolymer is fully or partially converted to a salt, the cation of said acid salt being a mono- or divalent metal from Group I or II of the Periodic Table;
   c. copolymers of ethylene and between 5 and 20 weight percent methacrylic acid wherein the acid portion of said copolymer is fully or partially converted to a salt, the cation of said acid salt being a mono- or divalent metal from Group I or II of the Periodic Table.

30. The method defined in claim 29 wherein the dyeability of said fiber or film is enhanced as a result of being contacted with between about 0.5 and 32% by weight of a weak acid type surfactant wherein the anionic group is a carboxyl group.

31. The method defined in claim 30 wherein said fiber or film is contacted with said surfactant prior to the dyeing step.

32. The method defined in claim 20 wherein said fiber or film is contacted with said surfactant during the dyeing step.

33. The method defined in claim 29 wherein the dyeability of said fibere of film is inhibited as a result of being contacted with between about 0.5 and 32% by weight of a strong acid type surfactant either before or during the dyeing process wherein the anionic group is selected from the group consisting of (1) sulfonate (2) sulfate (3) phosphate (4) polyphosphate.

34. The method defined in claim 30 wherein said anionic surfactant has the general formula $C_nH_{2n+1}$ B—(O—CH$_2$—CH$_2$—O—)$_x$CH$_2$—COOZ wherein B is phenyl or nothing; Z is hydrogen, sodium or potassium, and the ratio of $n$ to $x$ is from .5:1 to 3:1.

35. The method devined in claim 30 wherein the fiber or film is contacted with said anionic surfactant which is in paste form.

36. The method defined in claim 33 wherein the fiber or film is contacted with said anionic surfactant which is in paste form.

37. The method defined in claim 30 wherein (A) is polypropylene, (B) is the reaction product of a 1:1 styrene-maleic anhydride copolymer with (dimethylamino)propylamine, and (C) is the copolymer of ethylene and between 5 and 20 weight percent acrylic or methacrylic acid in free acid form or in a form wherein the acid portion of the copolymer is fully or partially converted to a salt, the cation of said salt being selected from the group consisting of sodium, potassium, zinc or calcium.

38. The method defined in claim 30 wherein (A) is polypropylene, (B) is the reaction product of a 1:1 ethylene-maleic anhydride copolymer with (dimethylamino)-propylamine, and (C) is the copolymer of ethylene and between 5 and 20 weight percent acrylic or methacrylic acid in free acid form wherein the acid portion of the copolymer is fully or partially converted to a salt, the cation of said salt being selected from the group consisting of sodium, potassium, zinc or calcium.

39. The method defined in claim 30 wherein (A) is polypropylene, (B) is the reaction product of N-methylbis-(aminopropylamine) with 2,4-tolylene diisocyanate, and (C) is the copolymer of ethylene and between 5 and 20 weight percent acrylic or methacrylic acid in free acid form or in a form wherein the acid portion of the copolymer is fully or partially converted to a salt, the cation of said salt being selected from the group consisting of sodium, potassium, zinc or calcium.

40. The method defined in claim 30 wherein (A) is polypropylene, (B) is the reaction product of N-methylbis-(aminopropylamine) with adipic acid, and (C) is the copolymer of ethylene and between 5 and 20 weight percent acrylic or methacrylic acid in free acid form or in a form wherein the acid portion of the copolymer is fully or partially converted to a salt, the cation of said salt being selected from the group consisting of sodium, potassium, zinc or calcium.

41. The method defined in claim 30 wherein (A) is polypropylene, (B) is a copolymer of ethylene and dimethylaminoethyl acrylate, and (C) is the copolymer of ethylene and between 5 and 20 weight percent acrylic or methacrylic acid in free acid form or in a form wherein the acid portion of the copolymer is fully or partially converted to a salt, the cation of said salt being selected from the group consisting of sodium, potassium, zinc or calcium.

42. The method defined in claim 30 wherein (A) is polypropylene, (B) is a copolymer of styrene and dimethylaminoethyl acrylate, and (C) is the copolymer of ethylene and between 5 and 20 weight percent acrylic or methacrylic acid in free acid form or in a form wherein the acid portion of the copolymer is fully or partially converted to a salt, the cation of said salt being selected from the group consisting of sodium, potassium, zinc or calcium.

43. The method defined in claim 30 wherein (A) is polypropylene, (B) is a copolymer of ethylene and dimethylaminoethyl acrylate and (C) is the copolymer of ethylene and between 5 and 20 weight percent acrylic or methacrylic acid in free acid form or in a form wherein the acid portion of the copolymer is fully or partially converted to a salt, the cation of said salt being selected from the group consisting of sodium, potassium, zinc or calcium.

44. The method defined in claim 30 wherein (A) is polypropylene, (B) is a copolymer of styrene and dimethylaminoethyl acrylate and (C) is the copolymer of ethylene and between 5 and 20 weight percent acrylic or methacrylic acid in free acid form or in a form wherein the acid portion of the copolymer is fully or partially converted to a salt, the cation of said salt being selected from the group consisting of sodium, potassium, zinc or calcium.

45. The method defined in claim 30 wherein (A) is polypropylene, (B) is a copolymer of ethylene and dimethylaminoethyl methacrylate and (C) is the copolymer of ethylene and between 5 and 20 weight percent acrylic or methacrylic acid in free acid form or in a form wherein the acid portion of the copolymer is fully or partially converted to a salt, the cation of said salt being selected from the group consisting of sodium, potassium, zinc or calcium.

46. The method defined in claim 30 wherein (A) is polypropylene, (B) is a copolymer of styrene and dimethylaminoethyl methacrylate, and (C) is the copolymer of ethylene and between 5 and 20 weight percent acrylic or methacrylic acid in free acid form or in a form wherein the acid portion of the copolymer is fully or partially converted to a salt, the cation of said salt being selected from the group consisting of sodium, potassium, zinc or calcium.

47. The method defined in claim 30 wherein (A) is polypropylene, (B) is an alkylbenzyl adduct of polyethyleneimine wherein the alkyl groups contain 8 to 12 carbon atoms, and (C) is a copolymer of ethylene and between 5 and 20 weight percent acrylic or methacrylic acid in free acid form or in a form wherein the acid portion of the copolymer is fully or partially converted to a salt, the cation of said salt being selected from the group consisting of sodium, potassium, zinc or calcium.

48. The method defined in claim 37 wherein the C component is the copolymer of ethylene and methacrylic acid which copolymer is 13% by weight methacrylic acid.

49. The method defined in claim 38 wherein the C component is a copolymer of ethylene and methacrylic acid wherein about 50% of the acid portion is in the sodium salt form.

* * * * *

UNITED STATES PATENT OFFICE
CERTIFICATE OF CORRECTION

Patent No. 3,926,553        Dated December 16, 1975

Inventor(s) Ronald W. Fuest

It is certified that error appears in the above-identified patent and that said Letters Patent are hereby corrected as shown below:

Column 6, line 59, the formula

"$C_nH_{2n+1}B-O-(CH_2-CH_2-O)_x-CH_2-COOZ$" should read

-- $C_nH_{2n+1}B-O-(CH_2-CH_2-O)_x CH_2-COOZ$ --

Column 19, line 16, the word "mino" should read -- mono --; same column, same line, the number "1" should read -- I --.

Column 20, line 15, the word "fibere" should read -- fiber --.

Column 20, line 26, the word "devined" should read -- defined --.

Signed and Sealed this

Twenty-seventh Day of December 1977

[SEAL]

Attest:

RUTH C. MASON
Attesting Officer

LUTRELLE F. PARKER
Acting Commissioner of Patents and Trademarks